May 26, 1970     V. H. JONES     3,513,606
STRUCTURAL FRAMEWORK AND CONNECTOR JOINT THEREFOR
Filed Feb. 21, 1968     5 Sheets-Sheet 3
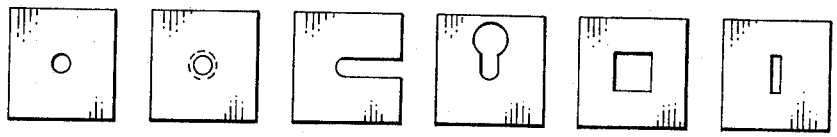
FIG. 10a   FIG. 10b   FIG. 10c   FIG. 10d   FIG. 10e   FIG. 10f
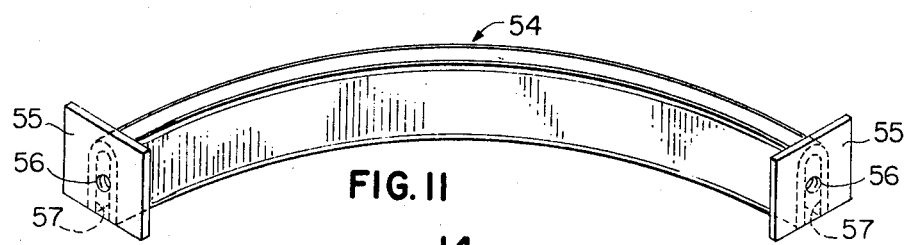
FIG. 11
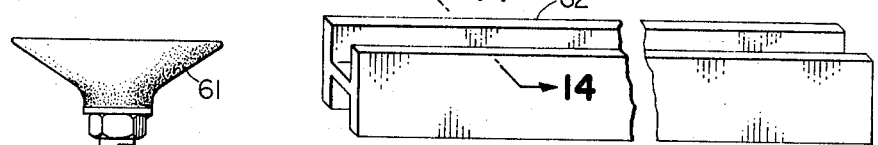
FIG. 13
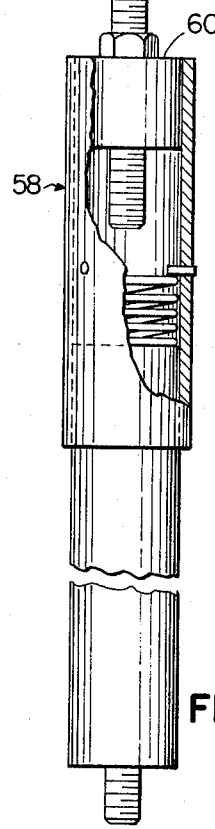
FIG. 12
FIG. 14
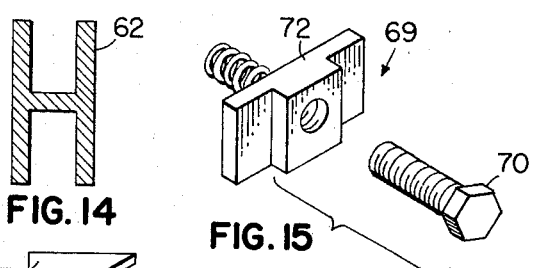
FIG. 15
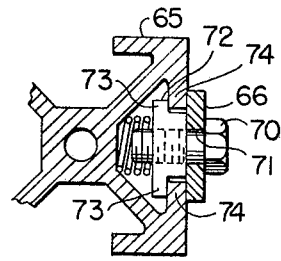
FIG. 16
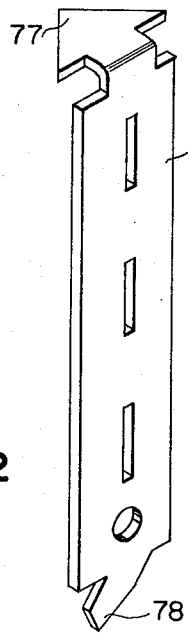
FIG. 17    FIG. 18
INVENTOR.
VERNON H. JONES
BY
*P. E. Milliken*
ATTORNEY

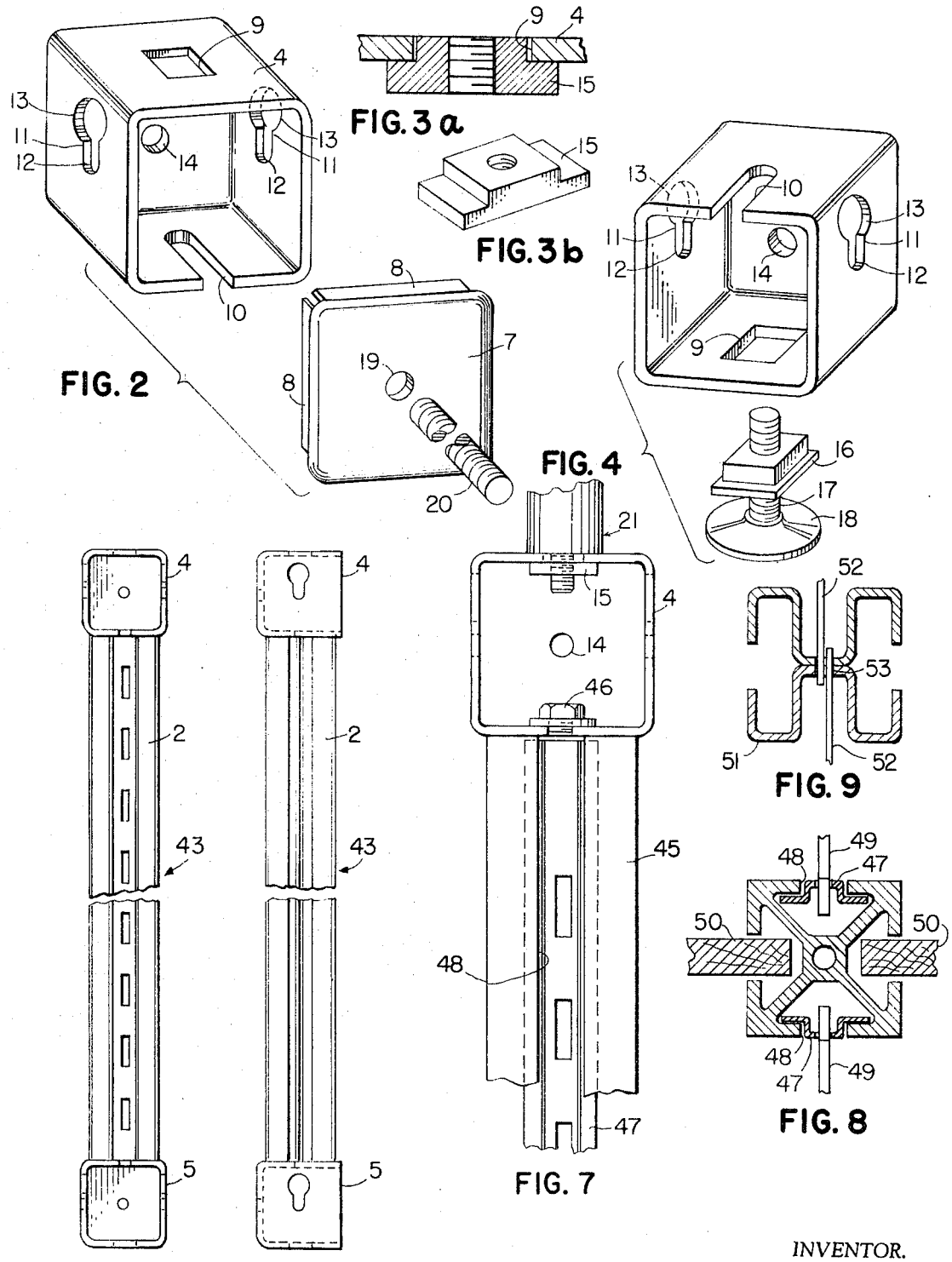

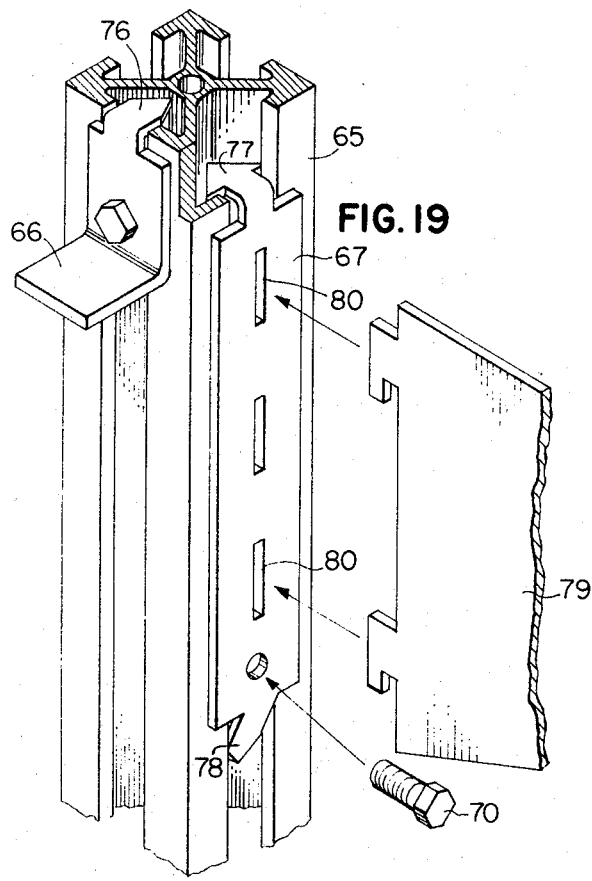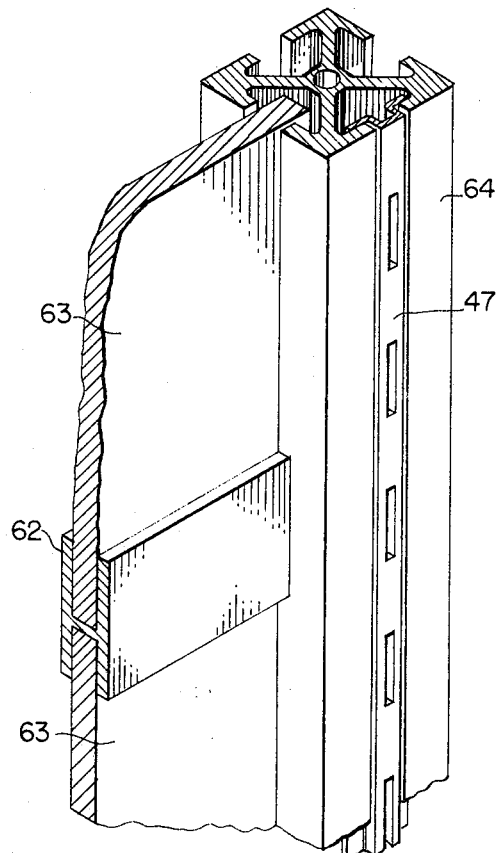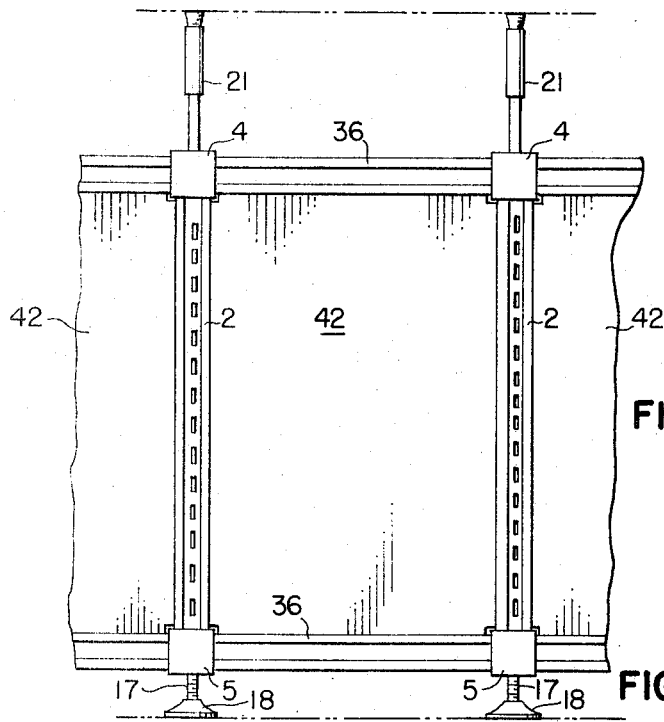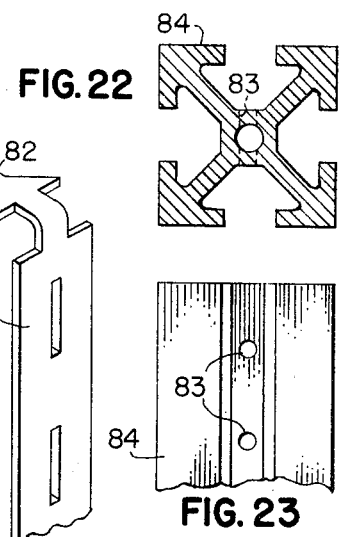

May 26, 1970    V. H. JONES    3,513,606
STRUCTURAL FRAMEWORK AND CONNECTOR JOINT THEREFOR
Filed Feb. 21, 1968    5 Sheets-Sheet 5

INVENTOR.
VERNON H. JONES
BY
*Milliken*
ATTORNEY

United States Patent Office 3,513,606
Patented May 26, 1970

3,513,606
STRUCTURAL FRAMEWORK AND CONNECTOR JOINT THEREFOR
Vernon H. Jones, Cuyahoga Falls, Ohio
(2553 Falmouth Road, Akron, Ohio 44313)
Filed Feb. 21, 1968, Ser. No. 707,209
Int. Cl. E04h *17/16, 17/18*
U.S. Cl. 52—27      6 Claims

ABSTRACT OF THE DISCLOSURE

A versatile joint structure for removably fastening together a structural framework which can be assembled in various combinations with panels to create removable walls, partitions, furniture, display fixtures, shelving racks, exhibits, sign frames and the like, all of which are neat and attractive in appearance and yet may be easily assembled and later disassembled for moving and reuse elsewhere with a minimum time and effort. This structure is comprised primarily of a number of frame members of rectangular cross-section joined together at their ends by hollow rectangular junction boxes, each box having specially contoured holes in its walls for receiving bolts or screws which are threaded into the ends of the frame members. The frame members are contoured to receive and support panels, shelves, and miscellaneous brackets and fixtures.

PRIOR ART

In the past, various types of framework structures have been devised for supporting panels and shelving, for portable walls, display fixtures and other similar structures. Some of the main disadvantages of these prior art devices is that they have involved too many complicated parts, they have been too time consuming to assemble and disassemble, and they are not sufficiently versatile to be used in many different types of structures.

The closest prior art to the present invention of which I am aware are Pat. No. 3,197,822, issued to W. Herrschaft, Pat. No. 3,282,006, issued to P. F. Halsey et al., and Pat. No. 3,295,283, issued to J. B. Griffith et al. All of these patents deal primarily with structural frame members having longitudinal grooves or channels for receiving panels to be supported by the framework and having some particular fastener means for attaching the frame members to each other.

OBJECTS OF THE INVENTION

A primary object of my invention is to provide a new and unusual junction box for removably connecting together elongated structural frame members in various combinations with panels in such manner as to provide a great variety of designs and arrangements of structural assemblies such as temporary walls, display fixtures, shelving racks and the like, which have great strength and rigidity, but which may easily and rapidly be assembled and disassembled.

Another object of my invention is to provide an assortment of other component parts designed especially for attachment to my junction box or one of my structural frame members to expand the usefulness of the completed assembly while using a minimum number of different specially designed parts and thus enable users to create low cost, quick installations of any one of an unlimited number of different designs of assemblies to fit any given amount of floor space, regardless of its size or shape or regardless of the peculiarity of any obstructions that are to be concealed from view by a finished assembly.

These and other objects of this invention will become more fully apparent in the following specification and the appended drawings.

BRIEF DESCRIPTION OF THE DRAWINGS

In the drawings:

FIG. 2 is a perspective view of a preferred embodiment of a junction box for use on the upper end of an elongated structural member of this invention;

FIG. 3a is a fragmentary cross-sectional view showing a square shouldered nut fitted into a square hole in the top of the junction box shown in FIG. 2;

FIG. 3b is a perspective view of the square shouldered nut shown in FIG. 3a;

FIG. 4 is a perspective view of a junction box similar to FIG. 2, but designed for use on the bottom end of an elongated frame member and including a square shouldered nut which fits into a square hole in the bottom of the junction box and carries a floor contacting pad;

FIG. 5 shows a front view of a subassembly consisting of a stamped metal frame member having a junction box welded to the top and bottom end;

FIG. 6 shows a side view of the subassembly shown in FIG. 5;

FIG. 7 is a fragmentary front view showing a junction box bolted to the top end of an extruded frame member and including a slotted insert and a tubular support member fastened to the top of the junction box;

FIG. 8 is a cross-sectional view through an extruded frame member showing panels and special slotted inserts in the longitudinal channels of the frame member;

FIG. 9 is a cross-sectional view through a stamped frame member similar to that shown in FIG. 5 with shelf brackets inserted through the center slots;

FIGS. 10a through 10f each shows a side of a junction box with a different type of hole to receive various types of connectors;

FIG. 11 is a perspective view of a curved frame member having end plates for connecting the frame member to a junction box;

FIG. 12 is a side view of a special spring loaded post for securing to a ceiling a framework made in accordance with this invention;

FIG. 13 is an intermediate frame member to be used in conjunction with the main structural frame members of this invention;

FIG. 14 is a cross-sectional view taken on line 14—14 of FIG. 13;

FIG. 15 is a perspective view of a special spring loaded nut and bolt used to attach certain brackets and fixtures to the elongated structural frame members of the invention;

FIG. 16 is a fragmentary cross-sectional view showing the special fastener of FIG. 15 mounted on an extruded frame member;

FIG. 17 is a perspective view of a slotted adapter for use in the longitudinal channel of an extruded frame member to adapt the frame member to receive shelf brackets;

FIG. 18 is a perspective view of a special right angled bracket for attachment to the elongated frame members of the invention;

FIG. 19 is a fragmentary perspective view of an extruded frame member showing the manner in which the special bracket and adapter shown in FIGS. 17 and 18 are attached to the frame member;

FIG. 20 is a fragmentary perspective view of an extruded frame member combined with panel inserts separated by an "H" shaped frame member as the type shown in FIG. 13 and a slotted insert of the type shown in FIGS. 7 and 8;

FIG. 21 is a fragmentary front view showing a structural assembly made from the component parts of this invention and mounted between a floor and ceiling to form a partition;

FIG. 22 is a cross-sectional view of an extruded frame member showing a transverse hole through its center core;

FIG. 23 is a fragmentary side view of the frame member shown in FIG. 22 and showing the manner in which the transverse hole is spaced from additional transverse holes passing through the center core of the frame member;

FIG. 24 is a fragmentary perspective view of a special slotted adapter similar to that shown in FIG. 17 but having the end contoured to fit in the transverse holes of the frame member shown in FIGS. 22 and 23;

DESCRIPTION OF PREFERRED EMBODIMENTS

Figure 1:
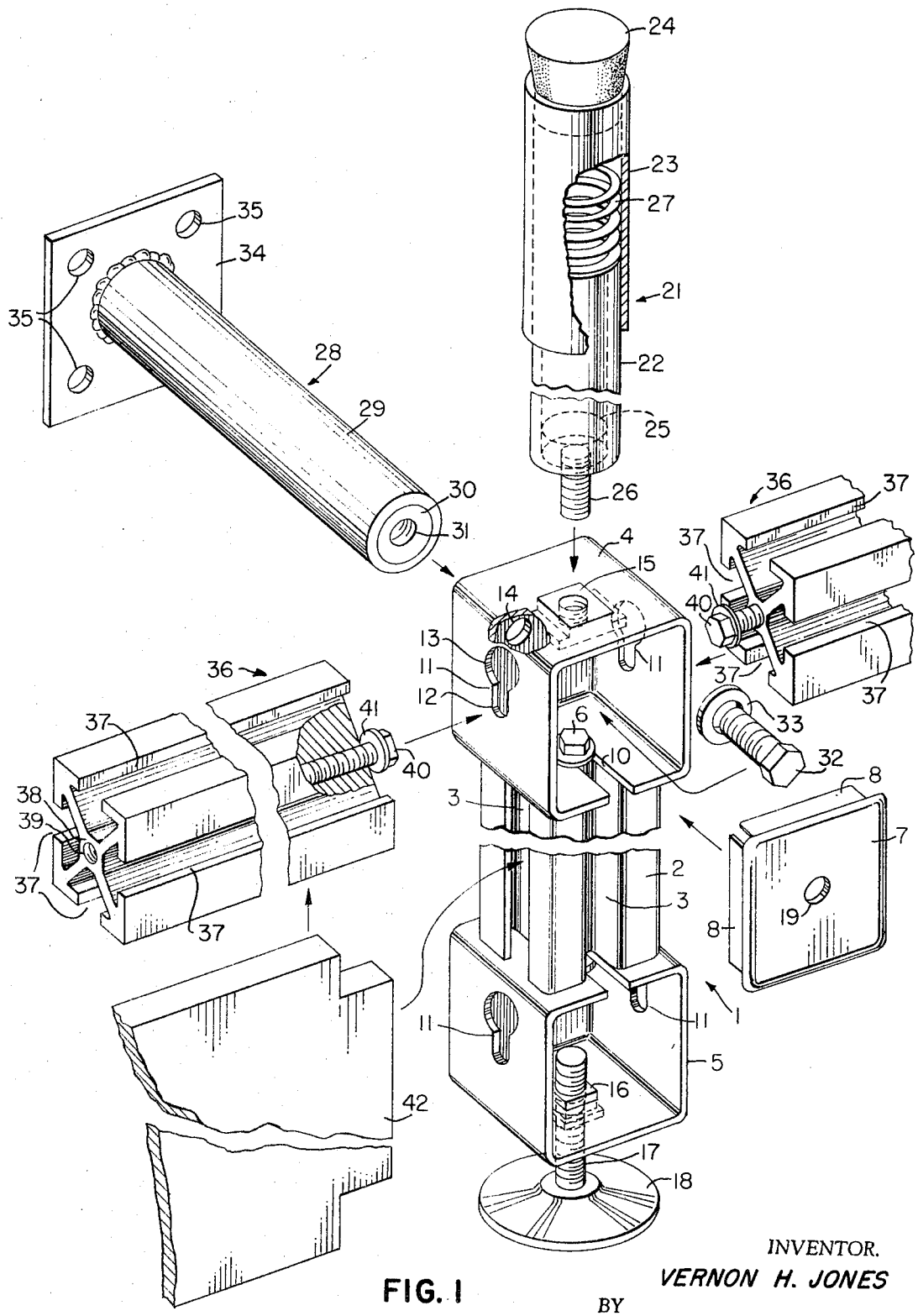
FIG. 1 is an exploded perspective view showing the manner in which the parts in a preferred embodiment of the invention are assembled together.
Figure 25:
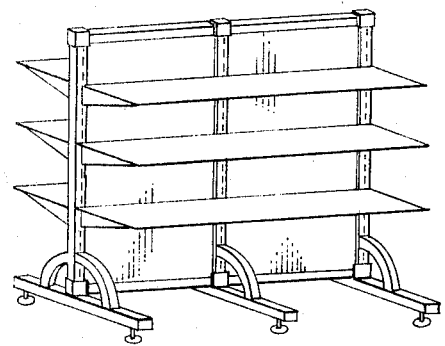
FIG. 25 is a perspective view showing the free standing shelf assembly made from the component parts of this invention.
Figure 26:
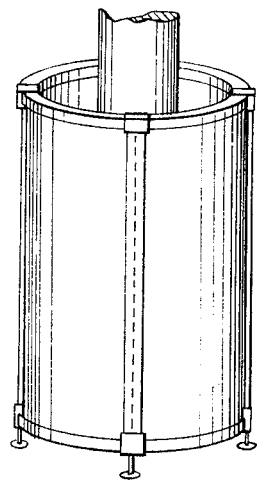
FIG. 26 is a perspective view of a cylindrical shaped wall surrounding a post and made from the structural components of this invention.
Figure 27:
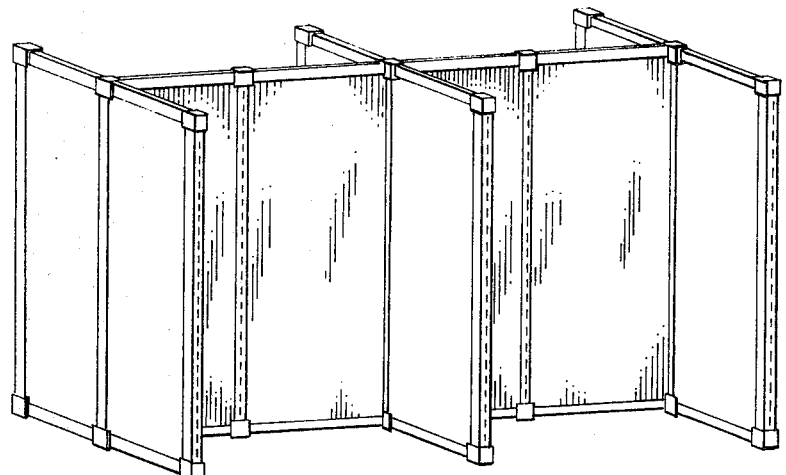
FIG. 27 is a perspective view of a series of paneled booths made from the component parts of this invention.
Figure 28:
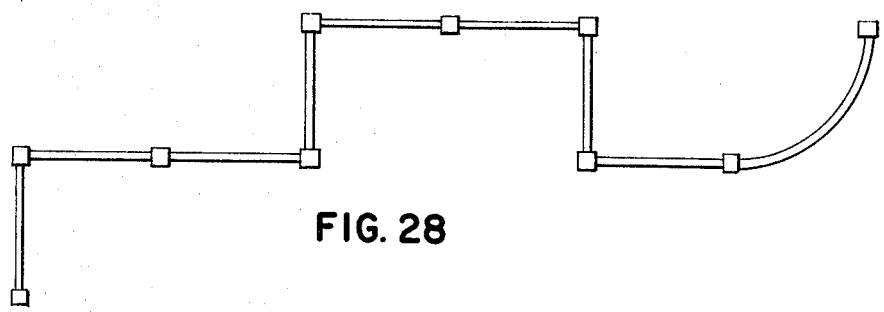
FIG. 28 is a plan view showing a wall made from the component parts of this invention and having a combination of irregular contours to fit into a particular location.

Referring now to FIG. 1 of the drawings which best illustrates a typical assembly of component parts of the invention, a vertical post assembly is indicated generally by the numeral 1. The post assembly 1 is one of the basic units of most structures that may be made with the component parts of this invention. The post assembly 1 is made up of an elongated frame member 2 which is substantially square in cross-section and which has a longitudinal channel 3 in each of its four sides. The frame member 2 has an upper junction box 4 attached to its upper end and a similar lower junction box 5 attached to its lower end. In the embodiment shown in FIG. 1, the upper junction box 4 and the lower junction box 5 are fastened to the ends of frame member 2 by bolts 6 which are threaded into centrally located threaded holes in the end of the frame member 2. The junction boxes 4 and 5 may, if desired, be fastened to the frame member 2 by welding whenever it is not necessarily required that the junction boxes be removed from the frame member 2.

Referring now to FIG. 2, the upper junction box 4 is in the shape of a hollow cube like box which is open at one end to receive a square snap in type cover plate 7 which is made preferably of plastic. The cover plate 7 has a retaining tab 8 along each edge thereof which extend into the junction box 4 when the cover plate 7 is placed in position and which engage the inside edge of the junction box 4 near the open end thereof to retain the cover plate 7 in position. In the preferred embodiment of the junction box 4 as shown in FIG. 2, the top of the box 4 has a square hole 9 centrally located therein. The bottom of the box 4 has a centrally located slotted hole 10 which extends from the center of the box to the open end of the box. Each side of the junction box 4 has a key hole shaped opening 11 which has a smaller portion 12 on the bottom thereof, and a larger portion 13 on the top thereof. The back of the junction box 4 has a centrally located round hole 14. The lower junction box 5 is similar to the upper junction box 4 in every respect except that the square hole 9 is located in the bottom of the junction box 5 and the slotted hole 10 is located in the top of the junction box 5. The position of the key holes 11 and the round hole 14 are identical to those in the upper junction box 4. The square hole 9 in the top of junction box 4 is designed to receive a square shouldered nut 15 as shown in FIGS. 3a and 3b. The nut 15 is used for attaching various members to the top of the junction box 4 as will be explained later in the specifications. The square hole 9 in the bottom of the lower junction box 5 receives a square shouldered nut 16 into which is screwed a threaded shank 17 having a flat circular foot pad 18 attached to the lower end thereof and adapted to rest on the floor to support a structural assembly of the various parts of the invention. Both the upper junction box 4 and the lower junction box 5 may use the same identical cover plate 7. As shown in FIG. 2, the cover plate 7 has a centrally located round hole 19 through which a headless threaded shank 20 may extend. In normal use in the assembly, the threaded shank 20 would be of sufficient length to extend through the hole 19 in the cover plate 7 and the hole 14 in the back of the junction box 4 and would protrude a short distance through both the front and rear of the junction box 4 for attaching additional component parts thereto. Referring again to FIG. 1, the manner in which the various component parts are attached to the holes in junction boxes 4 and 5 may now be more easily understood. A spring loaded ceiling engaging post 21 is shown in a position to be joined to the top of the junction box 4. The post 21 has an inner tubular member 22 which is telescopically received inside an outer tubular member 23. The top of the outer member 23 carries a resilient plug type pad 24 for engaging a ceiling. The lower end of the inner tubular member 22 has an end plug 25 which contains a threaded shank 26. The threaded shank 26 screws into the nut 15 in the top of the junction box 4 and fastens the post 21 to the top of the junction box 4. A coil spring 27 is located inside the tubular member 23 to bear against the upper end of the inner tubular member 22 and urge the members 22 and 23 to slide in a longitudinal direction away from each other and thereby cause the post 21 to elongate. This tendency for the post 21 to elongate will cause the resilient pad 24 to bear against a ceiling when the post 21 is connected to a vertical post assembly 1 and will hold the entire assembled unit in a vertical position between a floor and ceiling. The lower junction box 5 in FIG. 1 is shown with the square nut 16, the threaded shank 17, and the flat circular foot pad 18 assembled in position in the square hole 9 in the bottom of the junction box 5. By rotating the threaded shank 17, the distance of the foot pad 18 from the junction box 5 may be adjusted. Such adjustment will serve to raise and lower the entire assembly and may also be used as a means for increasing the spring tension applied against the ceiling by the post 21.

Whenever it is impractical or for some reason undesirable to use the post 21 to fasten the upper end of the post assembly 1 to a ceiling, an alternative fastening method may be used which involves the use of a wall mounting bracket 28, consisting of a tubular member 29 having an end plug 30 which contains a threaded hole 31 for receiving a bolt 32 which passes through the hole 14 in the back of the junction box 4. A lock washer 33 may be used with the bolt 32 to insure that the junction box 4 is securely fastened to the wall bracket 28 by the bolt 32. The end of the bracket 28 opposite that which bolts to the junction box 4, has a flat plate 34 welded thereto, perpendicular to the longitudinal axis of the tubular member 29. Plate 34 has a plurality of holes 35 through which screws, bolts or other fasteners may be used to attach the bracket 28 securely to a wall.

Still referring to FIG. 1, a horizontal frame member 36 is shown on each side of the junction box 4 in position for attachment thereto. The frame members 36 as shown in FIG. 1 are made of extruded aluminum. They have a substantially square cross-section with longitudinal channels 37 in all four sides. Each frame member 36 has a square center core 38 with a threaded hole 39 in each end thereof for receiving a bolt 40 which fastens the frame member 36 to the side of a junction box through one of the key holes 11. The large portion 13 of each key hole 11 is big enough in diameter to receive the head of the bolt 40 and a washer 41. In order to fasten the frame members 36 to the junction box 4, the bolts 40 with the washers 41 thereon are screwed part way into the threaded holes 39. The heads of the bolts 40 and the washers 41 are then inserted through the large portion 13 of the key hole 11 and then moved downward so that the bolts 40 are resting in the smaller portion 12 of the key holes 11. The bolts are then tightened against the side of the junction box 4 to draw the end of each frame member 36 tightly against the junction box 4. It may readily be seen that similar frame members 36 may be fastened to the lower junction box 5 in the same manner as they are attached to the upper junction box 4. To assemble a panel 42 with the overall frame structure, one would first fasten a vertical post assembly 1 in position, then attach a horizontal frame member 36 to the lower junction box 5. The panel 42 would then be inserted in an upwardly facing channel 37 of the horizontal frame member 36 and in a side facing channel 3 of the vertical frame member 2. The top horizontal frame member 36 would then be dropped into position on top of the panel 42 with the top edge of the panel 42 inserted in the bottom channel 37 of the frame member 36. The frame member 36 would then be bolted to the upper junction box 4 as previously described. A second vertical post assembly 1 is then moved into position against the remaining vertical edge of the panel 42 and the junction boxes 4 and 5 on that post assembly 1 are fastened to the ends of the horizontal frame members 36 opposite to those ends which have previously been fastened to a vertical post assembly. It will be obvious that any number of panels may be added in the same manner, depending upon how long a structure is needed.

In the construction of a framework assembly according to this invention, it is preferable to use a stamped steel frame member such as that shown in cross-section in FIG. 9 for the vertical frame members. The frame member shown in FIG. 9 is constructed of two identical shapes of rolled steel welded together back to back. The outward appearance of the steel frame member, however, will be sufficiently similar to that of the extruded frame members that they may be used in combination with the extruded members without destroying the overall effect of unity of design. This is desirable because a stamped steel member is stronger and less expensive to produce. It may be desirable, however, in some instances to use an extruded aluminum frame member such as that shown in cross-section in FIG. 8 when a lightweight structure is desired. In FIG. 1 the vertical frame members 2 are made of stamped steel and the horizontal frame members 36 are made of extruded aluminum. It will be understood that both the vertical and horizontal frame members may be made either from stamped steel or extruded aluminum or from any other material which is suitable for the particular intended use. FIGS. 5 and 6 show a front and side view respectively of a vertical post assembly 43, similar to the post assembly 1 shown in FIG. 1, except that the junction boxes 4 and 5 are welded to the ends of the stamped steel frame member 44 rather than being attached with bolts as shown in FIG. 1.

FIG. 7 shows another embodiment of the invention in which the vertical frame member 45 made of extruded aluminum is bolted to the upper juction box 4 by a bolt 46 which is screwed into a threaded hole in the end of the frame member 45. A slotted adapter 47 is positioned in a channel 48 and serves as a means of adapting the extruded aluminum frame member to receive shelf brackets. FIG. 8 shows a cross-sectional view through the frame member 45 with the adapter 47 mounted in two of the opposite channels 48 and carrying shelf brackets 49. In addition, FIG. 8 shows panels 50 inserted in the two opposite channels 48 which do not carry the slotted adapter 47. Turning now to FIG. 7, the top of the junction box 4 has a ceiling engaging post 21 identical to that shown in FIG. 1 fastened to the top of the junction box by a square shouldered nut 15, such as that shown in FIGS. 3a and 3b.

FIG. 9 shows a stamped metal frame member 51 with shelf brackets 52 passing through slotted holes 53 in the center portion of frame member 51 and extending from each side thereof.

FIGS. 10a through 10f may be described briefly as showing the different types of holes which may be used in the walls of the junction box. FIG. 10a illustrates the use of a plain round hole, FIG. 10b shows a threaded hole, FIG. 10c shows an open end elongated slot, FIG. 10d shows a key hole slot, FIG. 10e shows a square hole, FIG. 10f shows a closed end elongated slot. Although in the brief embodiments of this invention certain combinations and arrangements of these holes have been shown for use in certain structural configurations, it will be understood that other combinations of these holes can be used when needed for a particular structural arrangement.

FIG. 11 shows a quarter circle curved frame member 54 for use on the top and bottom of the frame assembly instead of using straight frame members. The frame member 54 is useful when it is desired to incorporate one or more curved panels into the assembly. The frame member 54 is U shaped in cross-section and has a flat rectangular end plate 55 on each end thereof. Each end plate 55 is provided with a threaded hole 56 for fastening the frame member 54 to a junction box 4 or 5. When used in an assembly, the frame member 54 is fitted over the top and bottom of a curved panel, with the panel edge extending into the center channel 57 thereof.

FIG. 12 shows a ceiling engaging post 58 similar to the post 21 in FIG. 1, except that it has a threaded shank 59 which threadably engages a plug 60 in the top of post 58 and which carries a ceiling engaging suction cup on the upper end thereof. By rotating the threaded shank 59 with respect to the plug 60, the exposed length of the shank 59 may be adjusted to compensate for variations in ceiling height. The post 58 may be used interchangeably with the post 21, depending upon the structural demands of the particular assembly with which it is used.

FIGS. 13 and 14 show an H-shaped channel 62 for use where it is desirable to divide a paneled insert to present different textures or different sections of panels which go together to make a complete insert. The channel 62 is shown in FIG. 20 as a divider member between two panels 63 mounted in an extruded vertical frame member 64. The frame member 64 has a slotted adapter 47 similar to that shown in FIGS. 7 and 8 for receiving shelf brackets.

FIG. 19 shows an extruded vertical frame member 65 in which is mounted a right angled bracket 66 also shown in FIG. 18, and a slotted adapter bracket 67 also shown in FIG. 17. Both the bracket 66 and 67 are secured by a spring loaded nut and bolt assembly 69 shown in detail in FIG. 15. The manner in which the nut and bolt assembly 69 secures the brackets 66 and 67 in the channel 68 is best illustrated in the cross-sectional view shown in FIG. 16 of the frame member 65. The bolt 70 of the assembly 69 is threaded through a hole 71 in the bracket 66 and then through a square shouldered nut 72. To insert the nut in the channel 68 it is turned so that the longest dimension of the nut is aligned longitudinally with the channel 68. The nut 72 will then slip into the channel and may then be rotated 90° about its axis so that the shoulders 73 on each side of the nut will engage flanges 74 on each side of the channel 68. A spring 75 will hold the nut 72 against the flanges 74 in such manner that the square outer portion of the nut will prevent slippage or rotation in the channel 68. This makes it possible to tighten or loosen the bolt 70 without rotation of the nut which will remain in place even after the bolt is removed. The bracket 66 has an inwardly turned pointed tip 76 that bites into the center portion of the frame member 65 when the bracket 66 is positioned in the channel 68 and the bolt 70 is tightened. The adapter bracket 67 has a pointed tip 77 at the top thereof, and a pointed tip 78 at the bottom. Both these points bite into the frame member 65 when the bolt 70 is tightened in the same manner as the tip 76 on the bracket 66. In both the brackets 66 and 67 this biting action in combination with the clamping action of the nut and bolt assembly 69 secures the brackets in position and prevents them shifting or tipping within the channels 68 even when under heavy strain from weighted shelves, etc. that may be attached. Also shown in FIG. 19 is a fragmentary portion of a shelf bracket 79 showing the manner in which it may be inserted into the slots 80 of the adapter bracket 67.

In FIG. 24 an adapter bracket 81 similar to bracket 67 is shown. Bracket 81, however, instead of having a pointed tip has an extension tab 82 on the tip thereof, which is adapted to be inserted in transverse holes 83 in the center core of an extruded frame member 84 shown in FIGS. 22 and 23.

FIG. 21 shows a typical assembly of this invention utilizing vertical frame members 2 and horizontal frame members 36 as originally shown in FIG. 1, joined together by upper junction boxes 4 and lower junction boxes 5 and being mounted between a floor and ceiling by post members 21 and by threaded shanks 17 extending from the bottom of the junction boxes 5 and having foot pads 18 resting on the floor. Panels 42 are inserted between the frame members.

In the interest of brevity, FIGS. 25 through 28 will not be described in greater than that previously used in the initial description of the drawings since it should be fairly obvious from all the preceding description of how the various frame members and junction boxes may be attached together to form not only the structures shown in FIGS. 25 through 28, but also may form a multitude of other structures of many types and varieties, depending upon the requirements of a given situation.

Various modifications may be made in the embodiments shown herein without departing from the scope of this invention.

I claim:
1. A structural framework for a partition or the like comprising:
   (A) a plurality of six sided hollow junction boxes with at least one side of each box being removable and the exterior of the box forming the configuration of a plain cube;
   (B) at least part of the sides having a substantially centrally located slotted hole therethrough which is open ended on the end adjacent the removable side of the junction box;
   (C) a plurality of elongated frame members joined together by the junction boxes to form a framework defining at least one rectangular opening adapted to receive a flat rectangular panel;
   (D) each frame member being of substantially rectangular cross section and having a longitudinal channel on at least one side thereof;
   (E) each end of each frame member abutting against a side of one of the junction boxes with the threaded holes in the ends of each frame member aligned with a hole in the respective abutting side of the junction box;
   (F) a bolt passing from the inside of the junction box through the hole in the side of the junction box and engaging the threaded hole in the end of the abutting frame member thereby securely fastening the frame member and the junction box together when the bolt is tightened; and
   (G) at least one panel mounted in the rectangular opening formed by the frame members,
   (H) the open ended slotted holes permitting disconnection of the frame members from the junction boxes by loosening the bolts in the ends of the frame members and sliding the frame members laterally outwardly so that the bolts pass through the open ends of the slotted holes when the removable side is taken off the junction box.

2. A structural framework as claimed in claim 1 wherein the longitudinal channels in the frame members have smooth planar bottom surfaces and laterally inwardly extending flanges on each side thereof and wherein adaptor brackets are mounted in at least some of the longitudinal channels, said brackets comprising:
   (A) a flat body portion having a round hole therethrough;
   (B) at least one sharp pointed tab integral therewith protruding into the channel of the frame member and contacting the bottom thereof;
   (C) a bolt passing through the hole in the body portion; and
   (D) a nut on the bolt, said nut engaging the flanges on each side of the channel so that tightening of the forces of the pointed tab to slightly penetrate the smooth planar surface of the bottom of the channel and prevent relative movement of the bracket with respect to the frame member.

3. A structural framework as claimed in claim 1 wherein a snapin type cover plate is removably attached to the front of the junction box to cover the open front thereof and provide a more attractive appearance of the assembled framework while providing ready access to the inside of the junction box for fastening or unfastening the frame members.

4. A structural framework as claimed in claim 1 wherein at least part of the frame members are curved and at least part of the panels are curved in a shape which matches the curvature of the frame members.

5. A structural framework as claimed in claim 1 wherein part of the frame members have a junction box welded on each end to provide a subassembly for reducing erection time.

6. A structural framework for a shelf bracket assembly or the like comprising:
   (A) a plurality of rectangular hollow six sided junction boxes with at least one side of each box being removable and the exterior of the box forming the configuration of a plain cube;
   (B) at least part of the sides having a substantially centrally located slotted hole therethrough which is open ended on the end adjacent the removable side of the junction box;
   (C) a plurality of elongated frame members joined together by the junction boxes to form a rectangular framework;
   (D) each frame member being of substantially rectangular cross section and having a longitudinal threaded hole in each end thereof and a longitudinal channel on at least one side thereof with a smooth planar bottom surface;
   (E) each end of each frame member abutting against a side of one of the junction boxes with the threaded holes in the ends of each frame member aligned with a hole in the respective abutting side of the junction box;
   (F) a bolt passing from the inside of the junction box and engaging the threaded hole in the end of the abutting frame member thereby securely fastening the frame member and the junction box together when the bolt is tightened;
   (G) at least one adaptor bracket mounted in the longitudinal channel of at least part of the frame members, said brackets comprising;
      (1) a flat body portion having a rounded hole therethrough,
      (2) at least one sharp pointed tab integral therewith protruding into the channel of the frame member and contacting the bottom thereof,
      (3) a bolt passing through the hole in the body portion, and (4) a nut on the bolt, said nut engaging the sides of the channel so that tightening of the bolt forces the pointed tabs to slightly penetrate the smooth planar surface of the bottom of the channel and prevent relative movement of the bracket with respect to the frame member.

References Cited

UNITED STATES PATENTS

| | | | |
|---|---|---|---|
| 982,535 | 1/1911 | Rudekiewicz | 220—3.2 |
| 1,066,806 | 7/1913 | Freud | 248—244 |
| 2,053,462 | 9/1936 | Chaplin | 52—648 |
| 1,904,052 | 4/1933 | Katz | 248—243 |
| 2,161,492 | 6/1939 | Wadsworth | 220—3.2 |
| 2,205,189 | 6/1940 | Edwards | 220—3.2 |
| 2,643,170 | 6/1953 | Vanderveld et al. | 52—495 |
| 2,732,090 | 1/1956 | Karlin | 220—3.2 |
| 2,845,877 | 7/1958 | Bianchi | 248—243 |
| 3,080,980 | 3/1963 | Gibbons | 248—243 |
| 3,186,561 | 1/1965 | Strassle | 211—182 |
| 3,265,416 | 8/1966 | Downes | 52—238 |
| 3,285,283 | 1/1967 | Griffith et al. | 52—475 |

FOREIGN PATENTS

| | | |
|---|---|---|
| 287,209 | 7/1931 | Italy. |
| 806,242 | 12/1958 | Great Britain. |
| 1,231,738 | 4/1964 | France. |
| 425,124 | 5/1960 | Switzerland. |
| 826,354 | 1/1938 | France. |

FRANK L. ABBOTT, Primary Examiner

J. L. RIDGILL, Jr., Assistant Examiner

U.S. Cl. X.R.

52—239, 241, 243, 282, 648; 211—177, 182; 248—245